US012747044B2

(12) United States Patent
Zango

(10) Patent No.: US 12,747,044 B2
(45) Date of Patent: Sep. 29, 2026

(54) UNMANNED AERIAL VEHICLES (UAVS) AND CARRIER PLATFORMS THEREFOR

(71) Applicant: ELBIT SYSTEMS C4I AND CYBER LTD., Netanya (IL)

(72) Inventor: Ami Amos Zango, Netanya (IL)

(73) Assignee: ELBIT SYSTEMS C4I AND CYBER LTD., Netanya (IL)

( * ) Notice: Subject to any disclaimer, the term of this patent is extended or adjusted under 35 U.S.C. 154(b) by 0 days.

(21) Appl. No.: 19/156,355

(22) PCT Filed: Aug. 22, 2023

(86) PCT No.: PCT/IL2023/050888
§ 371 (c)(1),
(2) Date: Aug. 13, 2025

(87) PCT Pub. No.: WO2024/176213
PCT Pub. Date: Aug. 29, 2024

(65) Prior Publication Data

US 2026/0116591 A1 Apr. 30, 2026

(30) Foreign Application Priority Data

Feb. 22, 2023 (IL) .......................................... 300876

(51) Int. Cl.
*B64U 70/99* (2023.01)
*B64U 10/14* (2023.01)
(Continued)

(52) U.S. Cl.
CPC ............. *B64U 70/99* (2023.01); *B64U 10/14* (2023.01); *B64U 10/16* (2023.01); *B64U 70/20* (2023.01);
(Continued)

(58) Field of Classification Search
CPC ........ B64U 70/99; B64U 80/40; B64U 10/16; B64U 70/20; B64U 70/92; B64U 80/30;
(Continued)

(56) References Cited

U.S. PATENT DOCUMENTS 9,421,869 B1 * 8/2016 Ananthanarayanan ...................... B60L 5/005
10,099,561 B1 * 10/2018 Ananthanarayanan ...................... B60L 53/126
(Continued)

FOREIGN PATENT DOCUMENTS

KR 20180064184 A 6/2018
KR 102336741 B1 12/2021

*Primary Examiner* — Rodney A Bonnette
(74) *Attorney, Agent, or Firm* — FisherBroyles, LLP; Roger L. Browdy; James E. Mrose

(57) ABSTRACT

A system for unmanned vehicles and carriers therefor having a propulsion system, anchoring system, anchoring sites and a locking and unlocking mechanism. A carrier having one or more arresting locations. The propulsion system has at least one propeller for each rotor and at least one blade capable of rotating for each rotor. The locking and unlocking mechanism has a switching member such as a rod. The switching member in a standby position is in the path of the rotating propeller blade and upon being displaced into a position not in the path of the rotating blade is in an unlocking position sending a signal to unlock the UAV from the anchoring site.

20 Claims, 5 Drawing Sheets

(51) Int. Cl.

| | |
|---|---|
| ***B64U 10/16*** | (2023.01) |
| ***B64U 70/20*** | (2023.01) |
| ***B64U 70/92*** | (2023.01) |
| ***B64U 70/95*** | (2023.01) |
| ***B64U 80/30*** | (2023.01) |
| ***B64U 80/40*** | (2023.01) |
| ***B64U 80/82*** | (2023.01) |
| *B64U 30/20* | (2023.01) |
| *B64U 60/50* | (2023.01) |

(52) U.S. Cl.
CPC ............. *B64U 70/92* (2023.01); *B64U 70/95* (2023.01); *B64U 80/30* (2023.01); *B64U 80/40* (2023.01); *B64U 80/82* (2023.01); *B64U 30/20* (2023.01); *B64U 60/50* (2023.01)

(58) Field of Classification Search
CPC ........ B64U 10/14; B64U 70/95; B64U 80/82; B64U 30/20; B64U 60/50; B64U 70/90
See application file for complete search history.

(56) References Cited

U.S. PATENT DOCUMENTS

| | | | | |
|---|---|---|---|---|
| 11,117,667 | B1 * | 9/2021 | McGann ................ | B64U 10/13 |
| 11,175,655 | B1 * | 11/2021 | Mestler ................ | G05D 1/0022 |
| 2019/0176986 | A1 | 6/2019 | Addonisio et al. | |
| 2020/0140121 | A1 | 5/2020 | Kim | |
| 2021/0048832 | A1 * | 2/2021 | Leslie .................... | B64U 70/93 |
| 2022/0028286 | A1 | 1/2022 | Amsili et al. | |

* cited by examiner

UNMANNED AERIAL VEHICLES (UAVS) AND CARRIER PLATFORMS THEREFOR

TECHNOLOGICAL FIELD

The invention generally concerns unmanned vehicles and platforms for carrying same.

BACKGROUND

Unmanned Aerial Vehicles (UAVs) are commonly used to accomplish various tasks such as civilian tasks, including for example disaster relief, law enforcement, surveillance and surveying, filmmaking, journalism, scientific research, cargo transport, and agriculture, as well as military missions. The UAVs may be fully autonomous, remotely piloted, human controlled from afar or may have partial autonomous capabilities, requiring human intervention in some aspects of their operation.

While generally, UAVs can be deployed easily and quickly, are scalable and flexible, are cost-efficient, and possess high maneuverability, they are limited by less than perfect battery endurance, limited flight times and speed of deployment. UAV weight is a critical constraint that must be kept low to conserve battery energy, shorten the time necessary for deployment, and extend mission flight times.

GENERAL DESCRIPTION

The technology disclosed herein concerns a UAV carrier system that is configured to carry one or more easily deployable UAVs. The one or more UAVs are carried from a point of origin to a target destination allowing for the immediate deployment of the one or more UAVs while the carrier is in-flight, hovering or stationary on a surface. The limitations of the art relating to the amount of energy needed to maintain longer in-mission flight times and shorten UAV deployment times are addressed by the technology disclosed herein A system of the invention generally allows for immediate deployment of a UAV of any size from any docking surface by entering a ready-to-take-off mode, whereby the UAV only unlocks from the docking surface when the UAV rotors are operating. Unlocking from the docking surface does not necessarily result in or does not entail physical detachment from the docking surface and does not necessarily result in the UAV taking off.

In most general terms, the invention provides a system comprising a UAV, the UAV comprising an anchoring system configured for detachably engaging with an arresting location on a docking surface of any landing pad, landing surface, or platform, e.g., a platform of a UAV carrier or mothership. The arresting location comprises a locking/unlocking mechanism that is configured for manipulating the UAV anchoring system between a locked position and an unlocked position. The locking/unlocking mechanism comprises a switching member operable between a standby position and an unlocked position. In the unlocked position it generates an unlocking signal to the locking/unlocking mechanism to manipulate the anchoring system to switch from the locked position to the unlocked position. Rotation of at least one of the UAV's propeller blades physically interacts or encounters the switching member. This activates the switching member into the unlocking position, thereby unlocking the anchoring system. The disclosed technology uniquely allows for a fast deployment and rotor activation unlocking the UAV from the docking surface to bring the UAV into an immediate take-off action. Following unlocking of the mechanism, the UAV is in a ready-to-takeoff mode while still physically associated or in contact with and unlocked to the docking surface, such that actual take off can follow immediately upon command.

In a first of its aspects, the invention provides a system, which may be a UAV carrier or a UAV mothership, comprising one or more unmanned aerial vehicles (UAVs) detachably associated to an arresting position provided on a UAV docking surface, wherein each of the one or more UAVs has a body and a propelling system, said propelling system having at least one propeller with at least one propeller blade; and an anchoring system configured for detachably engaging with one or more arresting location provided on the docking surface;

a locking/unlocking mechanism on said docking surface, wherein said locking/unlocking mechanism is configured to manipulate the anchoring system of said one or more UAVs between a respective locked position and an unlocked position, wherein in said locked position the anchoring system of the UAV is engaged with said arresting location, and in said unlocked position the anchoring system of the UAV is disengaged from the arresting location; and a switching member engaging said locking/unlocking mechanism that is configured to switch between a standby position and an unlocking position at which it generates an unlocking signal to the locking/unlocking mechanism;

whereby rotation of said at least one propeller blade activates said switching member into the unlocking position, to thereby unlock the anchoring system.

It should be noted that while reference is made herein to UAVs, this is by no means limiting. The disclosure provided herein may be applied to drones and to any other type of unmanned vehicles known in the art. Thus, the term "UAV" and "drone" are interchangeable.

The invention further provides a UAV comprising a body and a propelling system comprising at least one propeller with at least one propeller blade; and an anchoring system configured for detachably engaging with an arresting location provided on a docking surface, e.g., a landing platform or a UAV carrier or a mothership.

The docking surface comprising a locking/unlocking mechanism configured for manipulating the anchoring system of the UAV between a respective locked position and unlocked position. In the unlocked position the anchoring system of the UAV is engaged with the arresting location and in an unlocked position at which the anchoring system of the UAV is disengaged from the arresting location. The unlocking mechanism comprises a switching member operable between a standby position and an unlocking position where the switching member generates an unlocking signal to the locking/unlocking mechanism. The rotation of the at least one propeller blade activates the switching member into the unlocking position, to thereby unlock the anchoring system.

Also provided is a system comprising one or more UAV detachably associated to an arresting position provided on a UAV docking surface, wherein the one or more UAV comprising a body and a propelling system comprising at least one propeller with at least one propeller blade and an anchoring system configured for detachably engaging with an arresting location provided on the docking surface, e.g., of a landing platform or a UAV carrier or a mothership; and wherein the docking surface comprising a locking/unlocking mechanism configured for manipulating the anchoring system of the UAV between a respective locked position at which the anchoring system of the UAV is engaged with the arresting location, and an unlocked position at which the anchoring system of the UAV is disengaged from the arresting location, said locking/unlocking mechanism comprises a switching member operable between a standby position and an unlocking position at which it generates an unlocking signal to the locking/unlocking mechanism; whereby rotation of the at least one propeller blade activates the switching member into the unlocking position, to thereby unlock the anchoring system.

The invention further provides a landing platform for one or more UAVs. The landing platform comprises a docking surface comprising one or more arresting locations for detachably engaging with the one or more UAVs via an anchoring system of the UAV, each of the one or more arresting locations comprising a locking/unlocking mechanism configured for manipulating the anchoring system of the UAV between a respective locked position at which the anchoring system of the UAV is engaged with the arresting location, and an unlocked position at which the anchoring system of the UAV is disengaged from the arresting location, said locking/unlocking mechanism comprises a switching member operable between a standby position and an unlocking position at which it generates an unlocking signal to the locking/unlocking mechanism; whereby rotation of the at least one propeller blade activates the switching member into the unlocking position, to thereby unlock the anchoring system.

The UAV and systems of the invention may in some embodiments comprise:

1) a UAV comprising:
   a. a body and a propelling system comprising at least one propeller with at least one propeller blade; and
   b. an anchoring system configurable for detachably engaging with an arresting location provided on a docking surface, e.g., of a landing platform or of a UAV carrier or a mothership;
2) a docking surface comprising
   a. a locking/unlocking mechanism configured for manipulating the anchoring system of the UAV between a respective locked position at which the anchoring system of the UAV is engaged with the arresting location, and an unlocked position at which the anchoring system of the UAV is disengaged from the arresting location,
   b. said locking/unlocking mechanism comprises a switching member operable between a standby position and an unlocking position at which it generates an unlocking signal to the unlocking mechanism;

whereby rotation of the at least one propeller blade activates the switching member into the unlocking position, to thereby unlock the anchoring system.

The UAV comprising a body and a propelling system generally has one or more motors in a single rotor or a multi-rotor configuration and a corresponding number of propellors that transform rotary motion into linear thrust. The single rotor UAV may comprise a single propellor, or a multi-rotor UAV comprising two or more propellors, e.g., tricopters (3 rotors), quadcopters (4 rotors), hexacopters (6 rotors) and octocopters (8 rotors), among others. Each of the propellors is equipped with at least one propellor blade that is associated with the rotor. The propellers may be provided with two, three, or four blades.

The UAV body has a chassis, landing base or landing legs that may be equipped with an anchoring system or with a locking member configured to securely mount or associate or interact or engage with a docking position or docking station, referred to herein as an "arresting location" provided on the docking surface or on a launching platform or pad which may comprise one or more such arresting locations for engaging with a plurality of same or different UAVs. The one or more arresting locations are spaced apart on the docking surface, each being structured, configured and further operable to engage with a given UAV through the UAV's anchoring system. The arresting locations may be flat surfaces or 3-dimensional members configured to latch onto, to fit into, to physically associate, or interact with the anchoring system to cause a reversible attachment to the UAV. The UAV anchoring system is engaged with the arresting location to prevent movement of the UAV and secure its position on the docking surface. Each of the arresting locations may comprise a locking/unlocking mechanism that is configured for locking onto the anchoring system of the UAV, i.e., by manipulating the anchoring system of the UAV into a locked position, wherein the anchoring system of the UAV is engaged with the arresting location, or for releasing from the anchoring system, i.e., by transforming the locking position into an unlocked position at which the anchoring system of the UAV is disengaged from the arresting location.

As used herein, the expression "manipulating the anchoring system of the UAV" encompasses an interaction between the anchoring system and the corresponding reciprocal arresting location such that one actively latches onto the other or one actively interacts with the other in any way to transform into a locked association therebetween. Thus, locking may involve locking of the anchoring system to the arresting location or locking of the arresting location onto the anchoring system.

The UAV anchoring system may comprise a mechanical, magnetic, electromagnetic or an electric member or surface capable of reversibly interacting with a reciprocal or a matching member or surface provided at the arresting location. The anchoring system or the arresting location may comprise a hook, a latch, a projecting arm, a magnetic surface, or may have a 3D structure, etc., which can reversibly interact with a reciprocal element or member or surface on the other of the anchoring system at the arresting location.

In some embodiments, the anchoring system comprises a locking latch member or a latch-catch member, each being configured to associate with the other, wherein the locking latch may be provided on one of the UAV and the arresting location and wherein the latch catch is provided on the other of the UAV and the arresting location.

In some embodiments, the anchoring system comprises a magnetic attaching assembly. In some embodiments, the anchoring system comprises a solenoid.

The unlocking mechanism comprises a switching member operable between a standby position and an unlocking position. The switching member is configured to generate an unlocking signal when transforming from the standby position where the switching member is electrically or mechanical disengaged or disconnected from the unlocking mechanism to the unlocking position. When transforming to the unlocking position, the member is engaged with the unlocking mechanism, signaling the unlocking mechanism to disengage from the anchoring system of the UAV, allowing the UAV to take off upon command.

The switching member may be an actuator rod, or a rod element, that extends from the arresting location or generally from a region in the vicinity of the arresting location or from a base of the rod to a distance defined by a path of rotation of at least one of the UAV's propeller blades. The rod has a rod portion that is disposed at a path of rotation of the at least one propeller blade, such that rotation of the blade caused by rotor operation causes encountering of the blade with the rod. A position of the rod portion in the path of rotation, while the UAV rotor(s) is/are OFF, defines a standby position of the switching member. Encountering by the UAV blade(s) transforms the rod portion, and thus the switching member into the unlocking position. This transformation actuates the unlocking of the anchoring system from the arresting location.

The rod member may be positioned substantially perpendicularly to the surface of the platform or may be aligned upright, or may be slightly tilted such that a portion of the rod is disposed in the path of rotation. When the rotor blade(s) encounters the rod portion, the rod is tilted downwards such that the end portion of the rod member is at a position outside of the path of rotation.

Thus, in some embodiments, the locking/unlocking mechanism comprises an actuator rod which, at the standby position, has a rod portion disposed at a path of rotation of the least one propeller blade, wherein rotation of the propeller blade entails encountering with the rod portion of the actuator rod into the unlocking position, to thereby generate the unlocking signal.

In some embodiments, displacement of the actuator rod into the unlocking position, upon encountering by the propeller blade, activates a microswitch to generate the unlocking signal.

In some embodiments, when the actuator rod is at its unlocking position it is disposed outside of the path of rotation of the least one propeller blade.

The docking surface provided with one or a plurality of arresting locations may be any landing platform provided on a stationary surface or on a surface of a moving vehicle, including e.g., a UAV carrier, an aerial vehicle, a land vehicle, and a maritime vehicle. The surface may be a surface of a UAV carrier or a flying UAV carrier (such as a flying platform or a carrier drone) or a UAV mothership.

In some embodiments, systems of the invention are UAVs (or flying UAV carriers) for carrying one or a plurality (2 or more) of UAVs. In some embodiments, systems of the invention are motherships for carrying one or a plurality of UAVs, which may be same or different; wherein at least one of the UAVs is a UAV according to the invention. As used herein, the term "mothership" encompasses an unmanned filing vehicle that is configured to hold, carry and allow upward or downward UAV release.

The docking surface may provide the one or more UAVs with docking, networking and charging (or fueling) units. In configurations including a UAV carrier, one or more or each of the arresting locations may be in a form of a docking port which may be provided with an altimeter for measuring altitude, a compass, a multi-axis gyroscope for continuously identifying the directional motion, orientation and relative spatial position of the mounted UAV. The arresting locations as well as the UAVs may also incorporate Global Positioning Satellite (GPS) modules for location positioning, wireless communications module for cellular and/or satellite communications and/or any other communication module.

In some embodiments, each of the arresting locations is networked with a particular UAV positioned thereon and further with a central control. The arresting location may comprise or include one or more services to facilitate UAV guidance and maintenance. In some embodiments, the arresting location may be used as a recharging/refueling station for the UAV, may comprise a navigational aid to guide the UAV back to the arresting location and to provide routing information from the central control.

In some embodiments, the docking surface is a UAV carrier and the invention thus provides a system comprising one or more UAVs and a UAV carrier configured to carry the one or more UAVs from a point of origin to a destination; wherein the UAV carrier comprises a docking surface and a plurality of arresting locations distributed thereon, wherein each arresting location is provided with a locking/unlocking mechanism configured to engage to or disengage from the UAV;

- the arresting location further comprises an actuator rod extending from the surface of the arresting location such that a rod portion is disposed at a path of rotation of the UAV's propeller blade(s), wherein rotation of the propeller blade(s) entails encountering with the rod portion of the actuator rod;
- wherein the locking/unlocking mechanism comprises a switching member operable to generate an unlocking signal to the locking/unlocking mechanism upon encountering of the UAV's propeller blade(s) with the rod portion to thereby disengage the UAV from the arresting location.

The invention thus provides:

A system comprising one or more unmanned aerial vehicles (UAVs) detachably associated to an arresting position provided on a UAV docking surface,

- wherein each of the one or more UAVs has a body and a propelling system, said propelling system having at least one propeller with at least one propeller blade; and an anchoring system configured for detachably engaging with one or more arresting location provided on the docking surface;
- a locking/unlocking mechanism on said docking surface, wherein said locking/unlocking mechanism is configured to manipulate the anchoring system of said one or more UAVs between a respective locked position and an unlocked position, wherein in said locked position the anchoring system of the UAV is engaged with said arresting location, and in said unlocked position the anchoring system of the UAV is disengaged from the arresting location; and
- a switching member engaging said locking/unlocking mechanism that is configured to switch between a standby position and an unlocking position at which it generates an unlocking signal to the locking/unlocking mechanism;
- whereby rotation of said at least one propeller blade activates said switching member into the unlocking position, to thereby unlock the anchoring system.

In some embodiments of a system of the invention, the UAV docking surface is a stationary surface.

In some embodiments of a system of the invention, the UAV docking surface is a docking surface of a UAV carrier or mothership.

In some embodiments of a system of the invention, the one or more UAVs is a single rotor or a multi-rotor UAV.

In some embodiments of a system of the invention, the one or more UAVs having a chassis, a landing base or landing legs equipped with the anchoring system configured to securely engage with the arresting location provided on the docking surface.

In some embodiments of a system of the invention, the one or more arresting locations are spaced apart on the docking surface, each being structured, configured and operable to engage with said one or more UAVs through said anchoring system.

In some embodiments of a system of the invention, each of the one or more arresting locations is a flat surface or a 3-dimensional member configured to latch onto, to fit into, to physically associate with, or interact with the anchoring system to cause a reversible attachment to the UAV.

In some embodiments of a system of the invention, the UAV anchoring system comprises a mechanical, magnetic, electromagnetic or an electric member or surface capable of reversibly interacting with a reciprocal or a matching member or surface provided at the arresting location.

In some embodiments of a system of the invention, the anchoring system or the arresting location further comprises a hook, a latch, a projecting arm, a magnetic surface, or a 3D structure, structured to reversibly interact with a reciprocal element or member or surface on the other of the anchoring system and the arresting location.

In some embodiments of a system of the invention, the anchoring system comprises a locking latch member or a latch-catch member, each being configured to associate with the other.

In some embodiments of a system of the invention, the anchoring system comprises a magnetic attaching assembly.

In some embodiments of a system of the invention, the one or more propellor blades is configured to rotate and wherein the switching member is an actuator rod, or a rod element, extending from the arresting location or from a region in a vicinity of the arresting location or from a base of the rod to a distance defined by a path of rotation of the one or more of the UAV's propeller blades.

In some embodiments of a system of the invention, the switch member being positioned substantially perpendicularly to the surface of the platform or aligned upright, or is tilted such that a portion of the switch member is disposed at the path of rotation.

In some embodiments of a system of the invention, displacement of the switch member into the unlocking position, upon encountering by the one or more propeller blades, activates a microswitch to generate the unlocking signal.

In some embodiments of a system of the invention, wherein each of the one or more arresting locations being in a form of a docking port provided with an altimeter for measuring altitude, a compass, a multi-axis gyroscope for continuously identifying directional motion, orientation and relative spatial position of the UAV.

In some embodiments of a system of the invention, each of the one or more arresting locations and/or the one or more UAVs incorporate a GPS module for location positioning, with a wireless communication module for cellular and/or satellite communications.

In some embodiments of a system of the invention, each of the one or more arresting locations being networked with a particular UAV positioned thereon and further with a central control.

In some embodiments of a system of the invention, the UAV is a drone.

In some embodiments of a system of the invention, the system is a UAV carrier comprising two or more arresting locations configured to associate to two or more same or different UAVs.

In some embodiments of a system of the invention, the UAV carrier is a UAV mothership.

A landing platform is provided for one or more UAVs, the landing platform comprises a docking surface comprising one or more arresting locations for detachably engaging with the one or more UAVs via an anchoring system of the UAV, each of the one or more arresting locations comprising a locking/unlocking mechanism configured for manipulating the anchoring system of the UAV between a respective locked position at which the anchoring system of the UAV is engaged with the arresting location, and an unlocked position at which the anchoring system of the UAV is disengaged from the arresting location, said locking/unlocking mechanism comprises a switching member operable between a standby position and an unlocking position at which it generates an unlocking signal to the locking/unlocking mechanism;

whereby rotation of the at least one propeller blade activates the switching member into the unlocking position, to thereby unlock the anchoring system.

In some embodiments of a platform of the invention, the platform is a UAV carrier in a form of a UAV mothership.

A system is further provided which comprises one or more UAVs and a UAV carrier configured to carry the one or more UAVs from a point of origin to a destination; comprising a UAV having a body and a propelling system comprising at least one propeller with at least one propeller blade; and an anchoring system configured for detachably engaging with an arresting location provided on a docking surface;

the UAV carrier comprises a docking surface and a plurality of arresting locations distributed thereon, the docking surface comprising a locking/unlocking mechanism configured for manipulating the anchoring system of the UAV between a respective locked position at which the anchoring system of the UAV is engaged with the arresting location, and an unlocked position at which the anchoring system of the UAV is disengaged from the arresting location, said locking/unlocking mechanism comprises a switching member operable between a standby position and an unlocking position at which the switching member generates an unlocking signal to the locking/unlocking mechanism; whereby rotation of the at least one propeller blade activates the switching member into the unlocking position, to thereby unlock the anchoring system.

In some embodiments of a system of the invention, each arresting location is provided with a locking/unlocking mechanism configured to engage to or disengage UAV carrier from the UAV;

each of the plurality of arresting locations further comprises an actuator rod extending from the surface of each of the arresting locations such that a rod portion is disposed at a path of rotation of the UAV's one or more propeller blades, wherein rotation of the propeller blades entails encountering of the UAV's one or more propeller blades with the rod portion of the actuator rod, to thereby disengage the UAV from the arresting location.

In some embodiments of a system of the invention, the system is a UAV mothership.

BRIEF DESCRIPTION OF THE DRAWINGS

FIG. 2A shows the mechanism in a locked position. FIG. 2B shows the mechanism in an open position.

DETAILED DESCRIPTION OF EMBODIMENTS

The invention will now be further described in connection with the figures of the application. Each of the figures constitutes a separate embodiment of a UAV, a system, a landing platform, an aircraft carrier or any other element or feature of the invention.

As generally noted, the invention provides a system, which comprises UAV, which comprises an anchoring system configurable for detachably engaging with an arresting location on a docking surface, e.g., of a UAV carrier or a mothership or on any landing platform. The arresting location comprises a locking/unlocking mechanism that is configured for manipulating the UAV anchoring system between a locked position and an unlocked position, wherein said locking/unlocking mechanism comprises a switching member operable between a standby position and an unlocking position at which it generates an unlocking signal to the unlocking mechanism to manipulate the anchoring system from the locked position to the unlocked position. As disclosed herein, to allow for a fast deployment and a concerted rotor activation and unlocking from the docking surface, to thereby bring the UAV into an immediate take-off action, rotation of at least one of the UAV's propeller blades physically interacts or encounters the switching member and activates the switching member into the unlocking position, thereby unlocking the anchoring system. Following unlocking of the mechanism, the UAV is in a ready-to-takeoff mode, still physically associated, but not locked to the docking surface, such that actual take off can follow immediately upon command.

Figure 1:
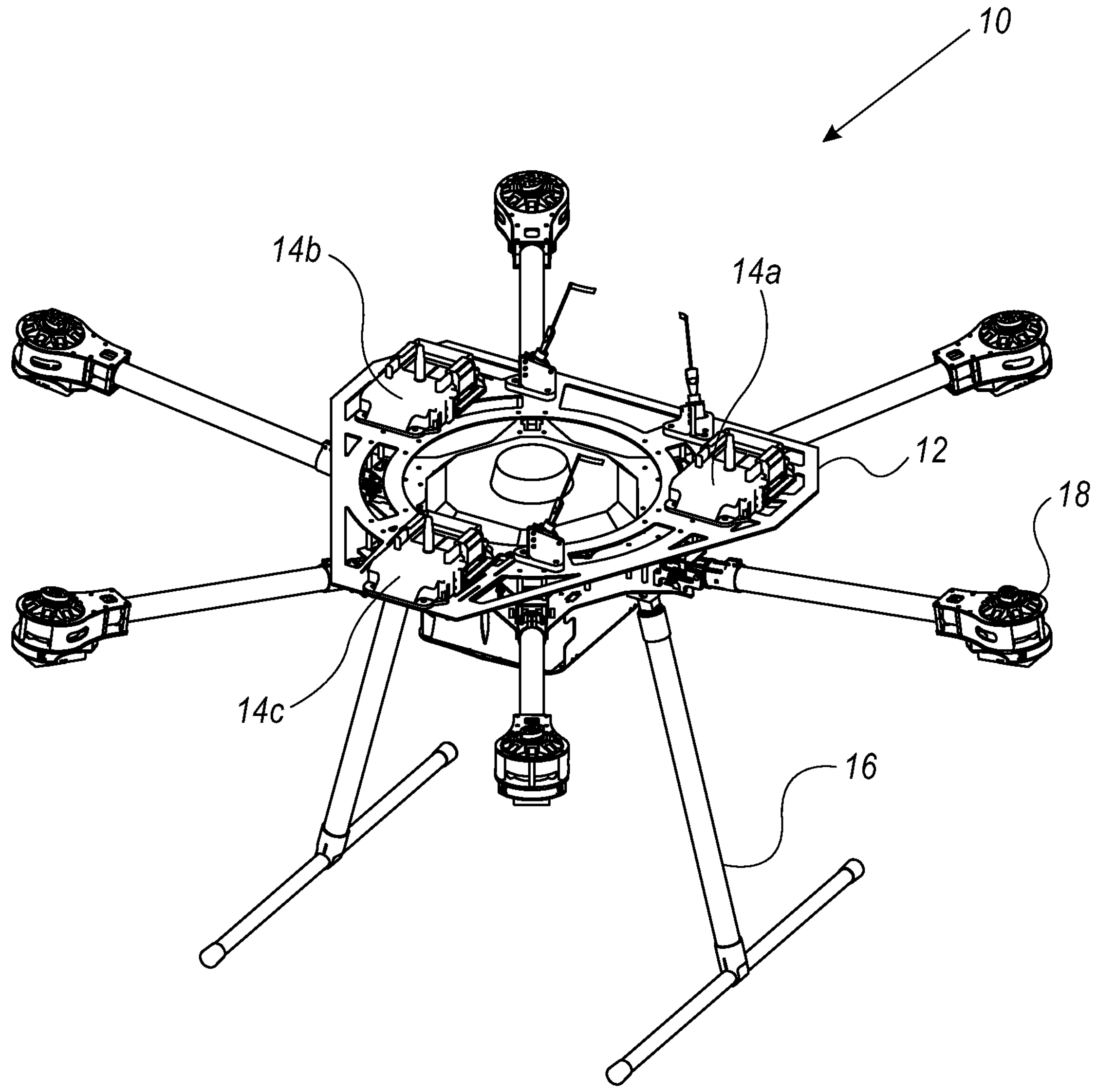
FIG. 1 demonstrates a landing platform in a form of a UAV carrier or mothership for carrying a plurality of UAVs.

Depicted in FIG. 1 is an exemplary landing platform for a UAV in a form of a UAV carrier 10 which comprises a docking surface 12 comprising three arresting locations designated 14*a*, 14*b* and 14*c*, for detachably engaging with one or more UAVs via an anchoring system of the UAV. Each of the arresting positions 14*a*, 14*b* and 14*c* provided on the docking surface 12 comprises a locking/unlocking mechanism configured for manipulating the anchoring system of the UAV. In the depicted UAV carrier, the carrier is provided on a set of landing legs or elements 16 and a plurality of rotors 18.

Figure 2A:
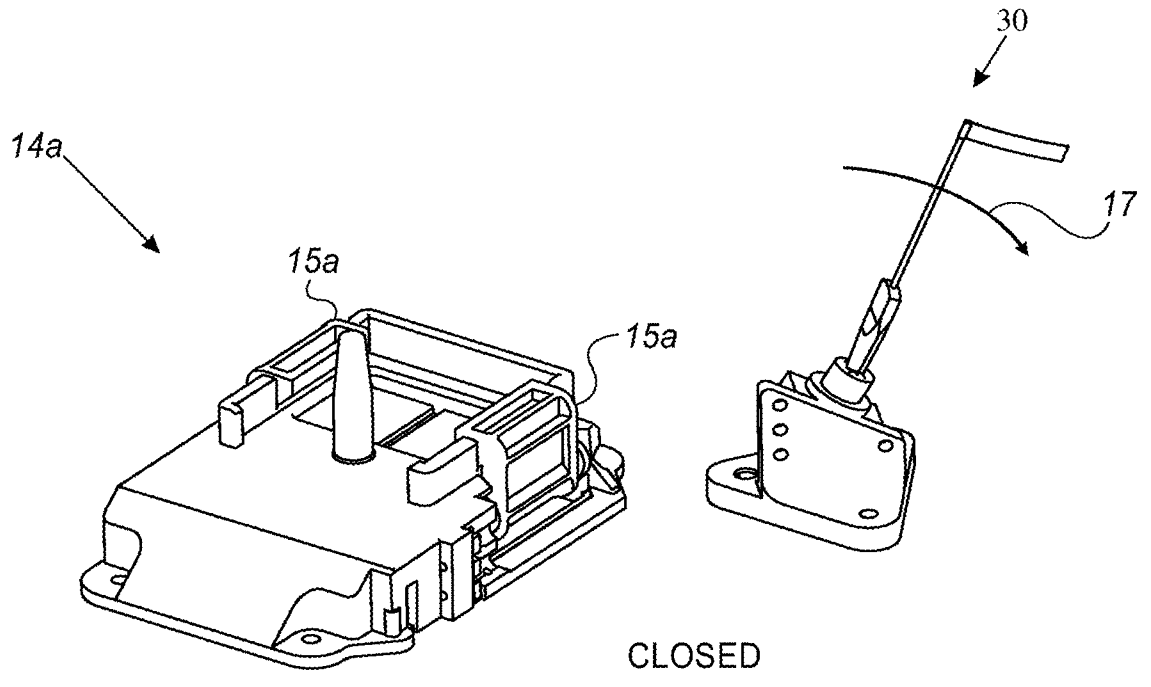
FIGS. 2A-B demonstrate an exemplary locking mechanism for engaging with a UAV.
Figure 2B:
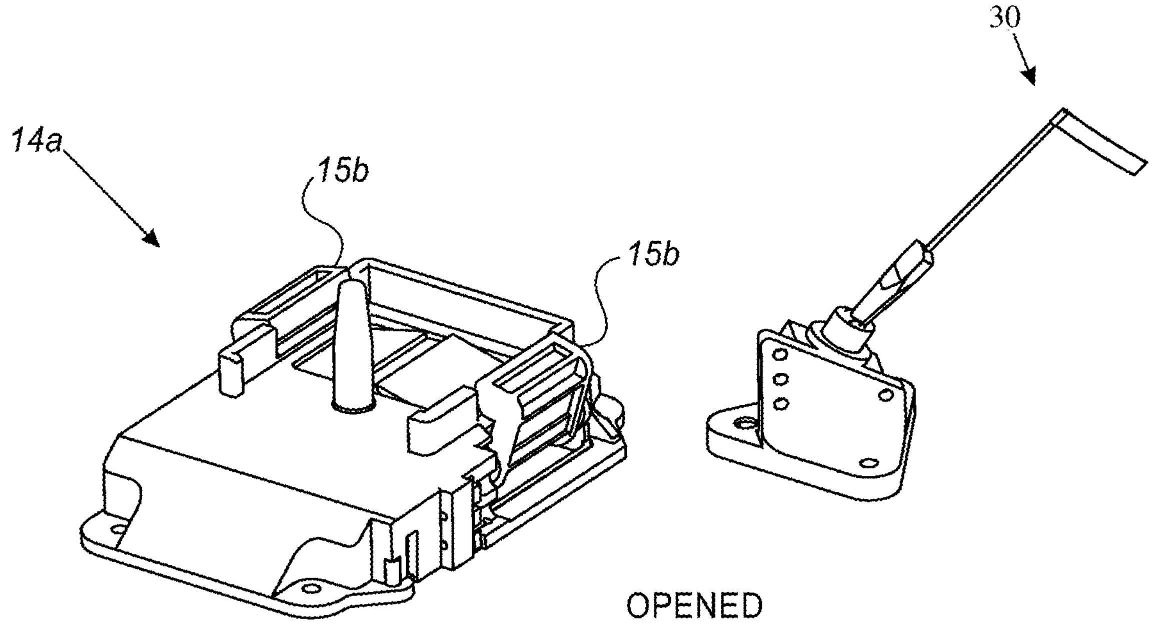

An expanded view of an arresting location is shown in FIGS. 2A and 2B. In the exemplary configuration, an arresting location, e.g., 14*a* provided on the docking surface 12 of FIG. 1 is provided with a locking/unlocking mechanism 15 that is configured to transition between a locked position 15*a* shown in FIG. 2A. The locking/unlocking mechanism engaging with an anchoring system of a UAV and an unlocked position 15*b* shown in FIG. 2B, which disengages from the UAV anchoring system. The locking/unlocking mechanism 15 comprises a switching member 30 operable between a standby position (as shown in FIG. 2A) that moves in the direction indicated by 17 to an unlocking position (as shown in FIG. 2B). In the unlocking position the an unlocking signal is generated to the locking/unlocking mechanism 15.

Figure 3A:
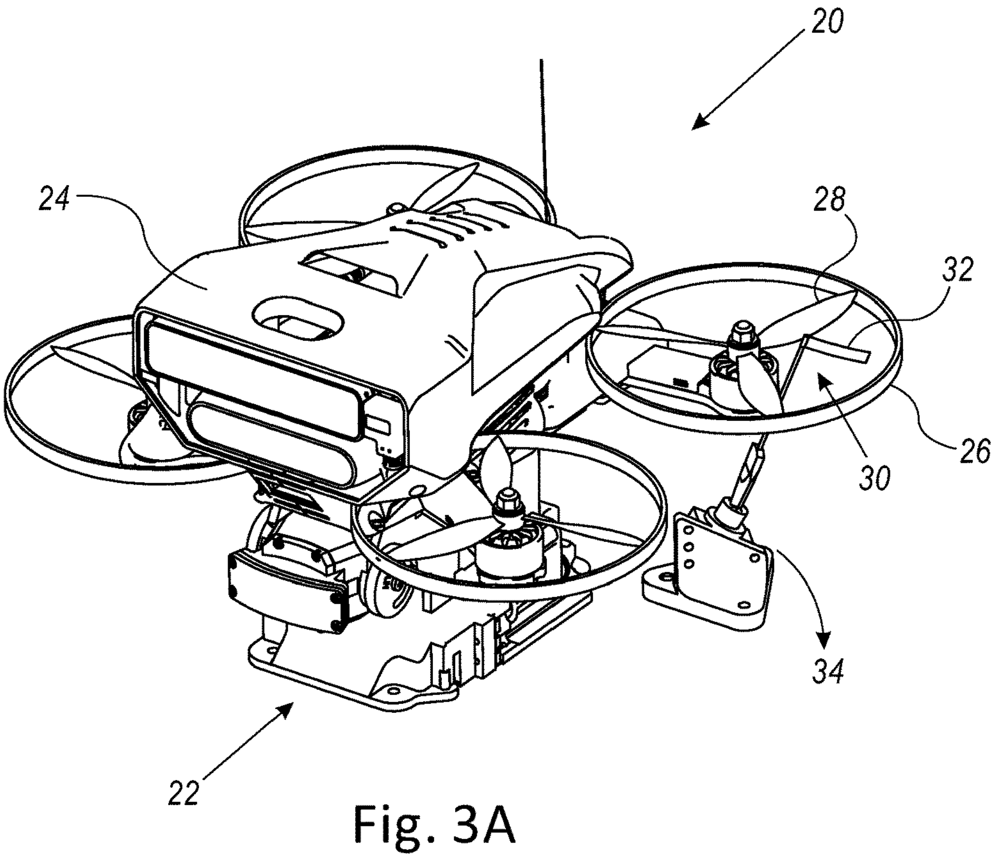
FIGS. 3A-B demonstrate an exemplary UAV when in an engaged state (FIG. 3A) and a disengaged state (FIG. 3B) from an arresting location on a UAV carrier.
Figure 3B:
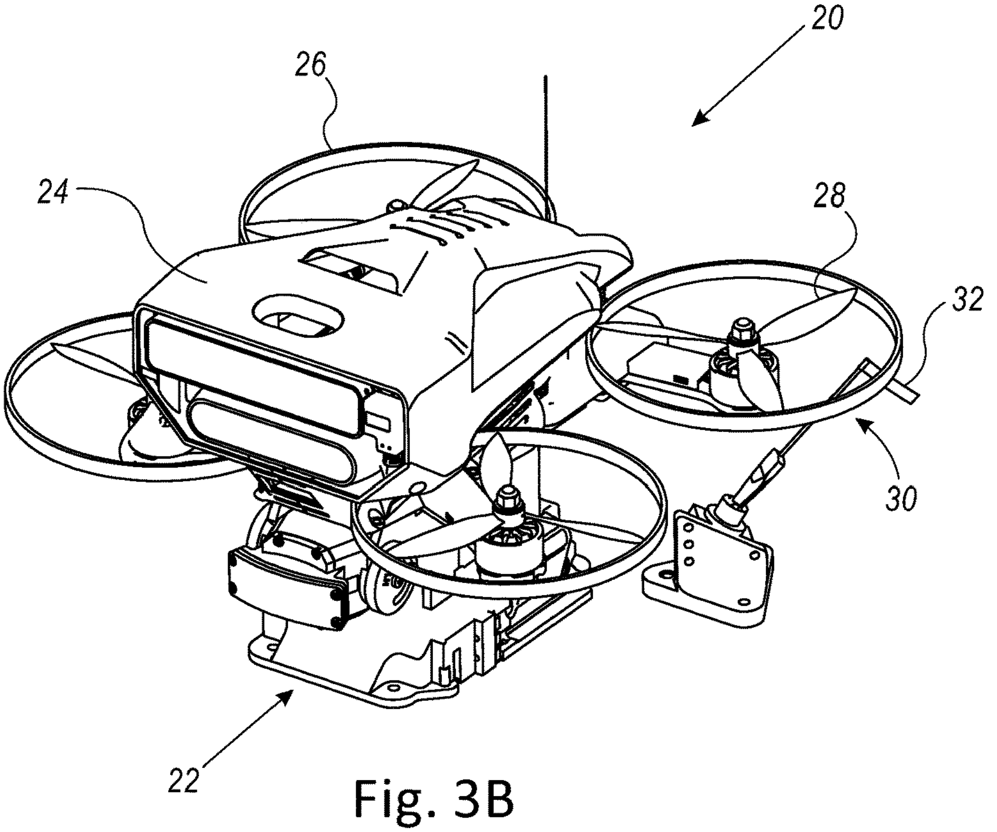

FIGS. 3A and 3B, demonstrate a UAV 20 detachably associated to an arresting position 22 (same as arresting position 14*a*, 14*b* or 14*c* of FIGS. 1 and 14*a* in FIG. 2A and FIG. 2B) provided on a UAV docking surface (not shown). The UAV 20 comprises a body 24 and a propelling system comprising at least one propeller 26 with at least one propeller blade 28 and an anchoring system configurable for detachably engaging with an arresting position 22 provided on a docking surface, being in the depicted embodiments a UAV carrier or a mothership. The locking/unlocking mechanism (shown in FIGS. 2A and 2B) is provided with a switching member 30 that is positioned in the rotation path of the propellor blade 28, as depicted in FIG. 3A. Rotation of the propeller blade 28 strikes switching member 30 activating switching member 30 into the unlocking position (depicted in FIG. 2B), to thereby unlock the anchoring system, as depicted in FIG. 3B.

The switching member may be an actuator rod 30 which at the standby position has a rod portion 32 of actuator rod 30 is disposed in the path of rotation of the least one propeller blade 28, when said UAV is positioned on the landing platform or carrier, wherein rotation of the propeller blade 28 encounters rod portion 32 of the actuator rod 30 displacing it as shown by direction 17 of FIG. 2A into the unlocking position, to thereby generate the unlocking signal. In some configurations, displacement of the actuator rod 30 into the unlocking position, upon encountering by the propeller blade 28, activates a microswitch positioned or provided at the base 34 of the rod 30 to generate the unlocking signal.

In some configurations, the actuator rod 30 is pivotally articulated to a locking/unlocking mechanism. Alternatively, a bottom end portion of actuator rod 30 is at base 34. The actuator rod 30 is pivotally articulated to the locking/unlocking mechanism of the landing platform or carrier. At the standby position the actuator rod 30 is disposed at substantially an upright position as depicted in FIGS. 2A and 3A or at a slightly tilted position, and at the unlocking position said actuator rod 30 is greatly or more tilted so that rod portion 32 is not positioned within the path of the rotating blades, as depicted in FIGS. 2B and 3B. When the actuator rod portion 32 of rod 30 is in the unlocking position it is disposed outside of the path of rotation of the least one propeller blade 28 as depicted in FIG. 3B.

Figure 4:
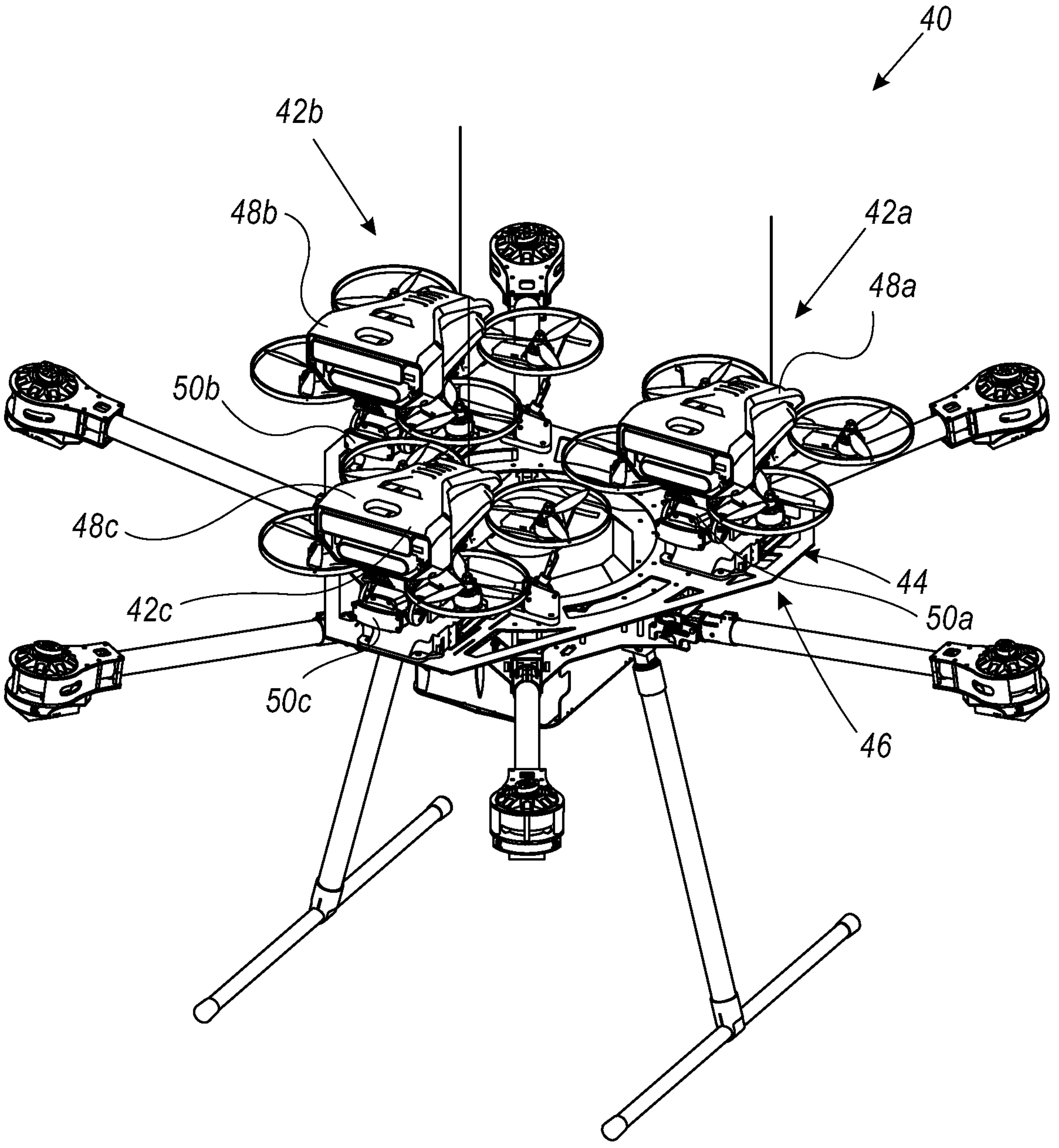
FIG. 4 depicts a UAV carrier carrying 3 UAVs, each positioned in a distinct arresting location on the carrier landing platform.

FIG. 4 depicts a UAV carrier 40 carrying 3 UAVs 42*a*, 42*b* and 42*c*, each being configured for detachably engaging with an arresting mechanism of a carrier 40, wherein the arresting mechanism is configured at a top face 44 of the carrier 40. In some configurations, the UAV may be configured for detachably engaging with an arresting mechanism for each UAV of a carrier 40 wherein the arresting mechanism is configured at a face such as bottom face 46 of the carrier 40.

As further depicted in FIG. 4, at least one UAV 42*a*, 42*b* and 42*c* has a body 48*a*, 48*b* and 48*c*, respectively, and a propelling system (in the depicted embodiments, each UAV has a propelling system comprising 4 propelling units, each comprising at least one propeller blade); wherein the carrier 40 is configured with arresting locations 50*a*, 50*b* and 50*c* for each accommodating a UAV. Each of the arresting locations comprises a locking mechanism that is configured for detachably engaging with an anchoring system of the UAV; an unlocking mechanism configured for manipulating the arresting mechanism between a respective locked position at which it is engaged with the arresting mechanism, and an unlocked position at which it is disengaged from the arresting mechanism; and a switching member operable between a standby position and an unlocking position at which it generates an unlocking signal to the unlocking mechanism; whereupon rotation of the at least one propeller blade of a UAV activates a respective switching member into the unlocking position, to thereby unlock the arresting mechanism to disengage from the anchoring system, to facilitate takeoff of the respective UAV.

Figure 5:
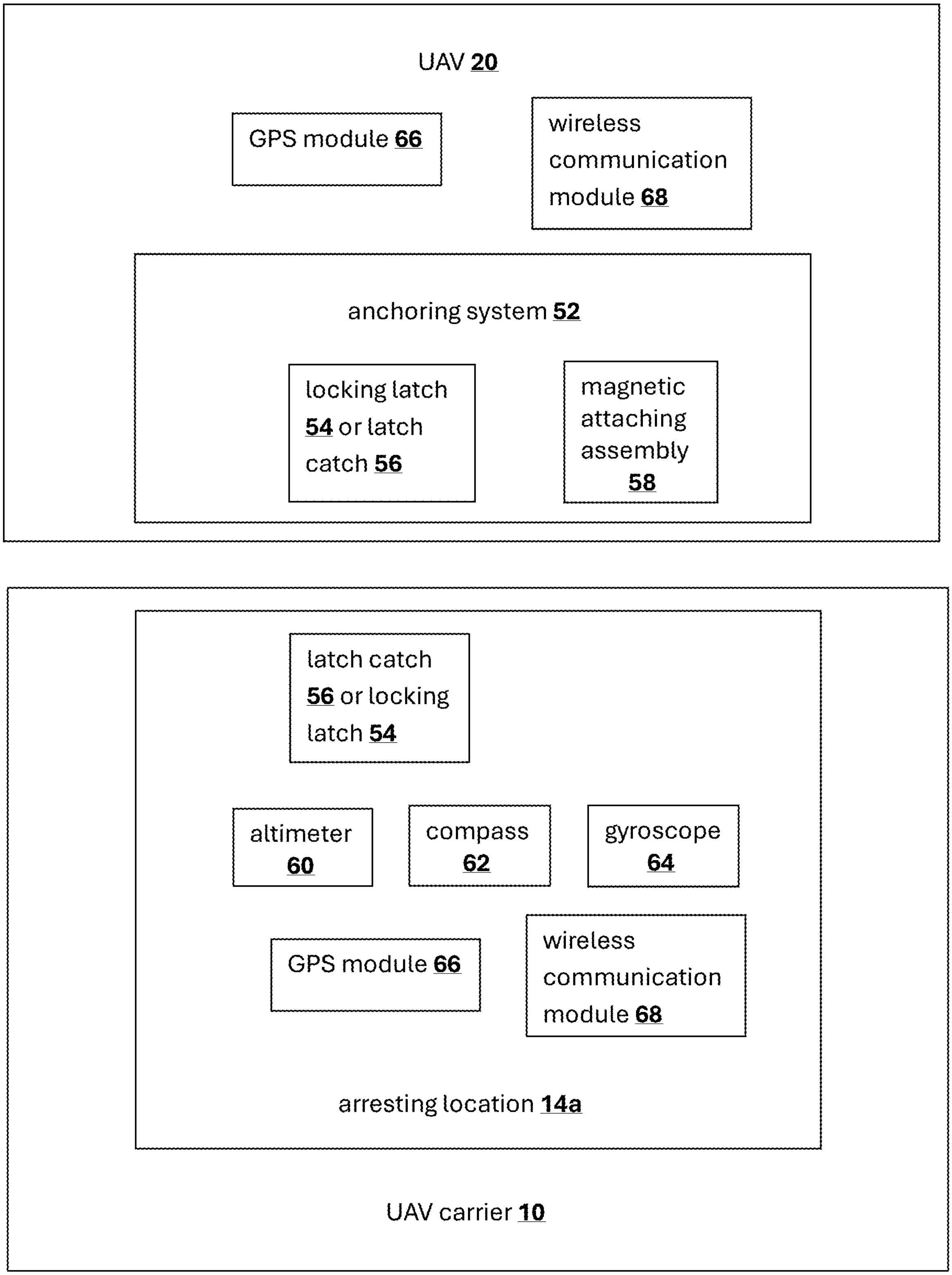
FIG. 5 is a block diagram of certain components of a UAV and a UAV carrier.

With reference to FIG. 5, illustrating an anchoring system 52 of a UAV 20 and a representative arresting location 14*a* of UAV carrier 10, a locking latch 54 is provided on one of anchoring system 52 of UAV 20 and arresting location 14*a* of UAV carrier 10, and a latch catch 56 is provided on the other of anchoring system 52 of UAV 20 and arresting location 14*a* of UAV carrier 10, each being configured to associate with the other. Alternatively, anchoring system 52 includes a magnetic attaching assembly 58.

Arresting location 14*a* may be in a form of a docking port provided with an altimeter 60 for measuring altitude, a compass 62, and a multi-axis gyroscope 64 for continuously identifying the directional motion, orientation and relative spatial position of the mounted UAV.

Arresting location 14*a* and/or UAV 20 incorporate a GPS module 66 for location positioning, with a wireless communication module 68 for cellular and/or satellite communications.

It is not intended that the example contained in this application are limiting of the disclosed technology.

The invention claimed is:

1. A system comprising one or more unmanned aerial vehicles (UAVs) detachably associated to an arresting position provided on a UAV docking surface, wherein each of the one or more UAVs has a body and a propelling system, said propelling system having at least one propeller with at least one propeller blade; and an anchoring system configured for detachably engaging with one or more arresting location provided on the docking surface;

a locking/unlocking mechanism on said docking surface, wherein said locking/unlocking mechanism is configured to manipulate the anchoring system of said one or more UAVs between a respective locked position and an unlocked position, wherein in said locked position the anchoring system of the UAV is engaged with said arresting location, and in said unlocked position the anchoring system of the UAV is disengaged from the arresting location; and a switching member engaging said locking/unlocking mechanism that is configured to switch between a standby position and an unlocking position at which it generates an unlocking signal to the locking/unlocking mechanism;

whereby rotation of said at least one propeller blade activates said switching member into the unlocking position, to thereby unlock the anchoring system.

2. The system according to claim 1, wherein the UAV docking surface is a stationary surface, or wherein the UAV docking surface is a docking surface of a UAV carrier or mothership.

3. The system according to claim 1, wherein the one or more UAVs having a chassis, a landing base or landing legs equipped with the anchoring system configured to securely engage with the arresting location provided on the docking surface.

4. The system according to claim 1, wherein the one or more arresting locations are spaced apart on the docking surface, each being structured, configured and operable to engage with said one or more UAVs through said anchoring system.

5. The system according to claim 4, wherein each of the one or more arresting locations is a flat surface or a 3-dimensional member configured to latch onto, to fit into, to physically associate with, or interact with the anchoring system to cause a reversible attachment to the UAV.

6. The system according to claim 5, wherein the UAV anchoring system comprises a mechanical, magnetic, electromagnetic or an electric member or surface capable of reversibly interacting with a reciprocal or a matching member or surface provided at the arresting location.

7. The system according to claim 6, wherein the anchoring system or the arresting location further comprises a hook, a latch, a projecting arm, a magnetic surface, or a 3D structure, structured to reversibly interact with a reciprocal element or member or surface on the other of the anchoring system and the arresting location.

8. The system according to claim 7, wherein the anchoring system comprises a locking latch member or a latch-catch member, each being configured to associate with the other.

9. The system according to claim 7, wherein the anchoring system comprises a magnetic attaching assembly.

10. The system according to claim 1, wherein said one or more propellor blades is configured to rotate and wherein the switching member is an actuator rod, or a rod element, extending from the arresting location or from a region in a vicinity of the arresting location or from a base of the rod to a distance defined by a path of rotation of the one or more of the UAV's propeller blades.

11. The system according to claim 10, wherein the switch member being positioned perpendicularly to the surface of the platform or aligned upright, or is tilted such that a portion of the switch member is disposed at the path of rotation.

12. The system according to claim 1, wherein displacement of the switch member into the unlocking position, upon encountering by the one or more propeller blades, activates a microswitch to generate the unlocking signal.

13. The system according to claim 1, wherein each of the one or more arresting locations being in a form of a docking port provided with an altimeter for measuring altitude, a compass, a multi-axis gyroscope for continuously identifying directional motion, orientation and relative spatial position of the UAV.

14. The system according to claim 1, wherein each of the one or more arresting locations and/or the one or more UAVs incorporate a GPS module for location positioning, with a wireless communication module for cellular and/or satellite communications.

15. The system according to claim 1, being a UAV carrier comprising two or more arresting locations configured to associate to two or more same or different UAVs.

16. The system according to claim 15, wherein the UAV carrier is a UAV mothership.

17. A landing platform for one or more UAV, the landing platform comprises a docking surface comprising one or more arresting locations for detachably engaging with the one or more UAVs via an anchoring system of the UAV, each of the one or more arresting locations comprising a locking/unlocking mechanism configured for manipulating the anchoring system of the UAV between a respective locked position at which the anchoring system of the UAV is engaged with the arresting location, and an unlocked position at which the anchoring system of the UAV is disengaged from the arresting location, said locking/unlocking mechanism comprises a switching member operable between a standby position and an unlocking position at which it generates an unlocking signal to the locking/unlocking mechanism;

whereby rotation of the at least one propeller blade activates the switching member into the unlocking position, to thereby unlock the anchoring system.

18. The platform according to claim 17, being a UAV carrier in a form of a UAV mothership.

19. A system comprising one or more UAVs and a UAV carrier configured to carry the one or more UAVs from a point of origin to a destination; comprising a UAV having a body and a propelling system comprising at least one propeller with at least one propeller blade; and an anchoring system configured for detachably engaging with an arresting location provided on a docking surface;

the UAV carrier comprises a docking surface and a plurality of arresting locations distributed thereon, the docking surface comprising a locking/unlocking mechanism configured for manipulating the anchoring system of the UAV between a respective locked position at which the anchoring system of the UAV is engaged with the arresting location, and an unlocked position at which the anchoring system of the UAV is disengaged from the arresting location, said locking/unlocking mechanism comprises a switching member operable between a standby position and an unlocking position at which the switching member generates an unlocking signal to the locking/unlocking mechanism;

whereby rotation of the at least one propeller blade activates the switching member into the unlocking position, to thereby unlock the anchoring system.

20. The system according to claim 19 wherein each arresting location is provided with a locking/unlocking mechanism configured to engage to or disengage UAV carrier from the UAV;

each of the plurality of arresting locations further comprises an actuator rod extending from the surface of each of the arresting locations such that a rod portion is disposed at a path of rotation of the UAV's one or more propeller blades, wherein rotation of the propeller blades entails encountering of the UAV's one or more propeller blades with the rod portion of the actuator rod, to thereby disengage the UAV from the arresting location.

* * * * *